United States Patent [19]

Costanzi et al.

[11] Patent Number: 4,935,063
[45] Date of Patent: Jun. 19, 1990

[54] FILLERS AND PIGMENTS POSSESSING ORGANIC POLYMER STABILIZING PROPERTIES AND A PROCESS FOR THEIR PREPARATION

[75] Inventors: Silvestro Costanzi, San Giuliano Milanese; Omero Zavattini, deceased, late of Curtatone, by Clara Pongiluppi, Renato Zavattini, heirs; Ugo Bersellini, Parma; Damiano Gussoni, Milan, all of Italy

[73] Assignee: Enichem Synthesis S.p.A., Palermo, Italy

[21] Appl. No.: 242,956

[22] Filed: Sep. 9, 1988

[30] Foreign Application Priority Data

Sep. 11, 1987 [IT] Italy ................ 21893 A/87

[51] Int. Cl.$^5$ ............ C08K 5/16; C04B 14/20; C09C 1/36
[52] U.S. Cl. .................... 106/506; 106/417; 106/446; 106/448; 106/499
[58] Field of Search ............ 106/499, 506, 448, 417, 106/446

[56] References Cited

U.S. PATENT DOCUMENTS

| | | | |
|---|---|---|---|
| 4,167,421 | 9/1979 | Linden et al. | 106/499 |
| 4,458,073 | 7/1984 | Marraccini et al. | 106/448 |
| 4,684,726 | 8/1987 | Greco et al. | 544/69 |

*Primary Examiner*—A. Lionel Clingman
*Assistant Examiner*—Christine A. Skane
*Attorney, Agent, or Firm*—Hedman, Gibson, Costigan & Hoare

[57] ABSTRACT

Stabilizing inorganic fillers or pigments having simultaneous reinforcing effect and stabilizing effect on organic polymers are obtained by a process comprising the following stages:

(a) bringing the inorganic filler or pigment into contact with a solution, in an inert organic solvent, of a sterically hindered amine comprising one or more alkoxysilane groups in its molecule;

(b) maintaining the obtained mixture at higher than ambient temperature (20°–25° C.) for a period of at least 0.5 hours;

(c) removing the solvent, treating at a temperature of 120°–200° C. and recovering the stabilizing filler or pigment obtained.

10 Claims, No Drawings

FILLERS AND PIGMENTS POSSESSING ORGANIC POLYMER STABILIZING PROPERTIES AND A PROCESS FOR THEIR PREPARATION

This invention relates to inorganic fillers and pigments having high compatibility with organic polymers and useful in their stabilization, and the process for preparing said fillers and pigments.

It is well known that organic polymers and particularly polyolefins are subject to degradation with time due to exposure to atmospheric agents and especially ultraviolet radiation, and easily undergo thermo-oxidative degradation during their processing and transformation.

This degradation appears as a worsening of the polymer physical characteristics, such as a reduction in ultimate tensile stress and flexibility, and alterations in the optical properties of manufactured articles.

To prevent said degradation phenomena arising it is usual to add stabilizer compounds to the polymer.

In addition to these compounds, inorganic fillers or pigments are generally also added to improve the polymer mechanical characteristics and reduce manufactured article costs.

For the action of stabilizers to be effective they must possess not only a high compatibility with the polymer matrix but also the property of non-extractability from it either during polymer transformation or during the subsequent life of the final manufactured article.

For their part, the fillers and pigments must be easily dispersible in and highly compatible with the polymer to which they are added.

The most commonly used stabilizers include sterically hindered amines and phenols, phosphorated compounds, sulphides, hydroxybenzotriazoles, hydroxybenzophenone derivatives, aromatic oxamides and certain particular organo-nickel complexes.

Particularly effective, especially because of their non-extractability characteristics, are stabilizers in the form of sterically hindered amines containing one or more hydrolysable alkoxysilane groups in the molecule (U.S. Pat. No. 4,684,726 and patent application No. 103,961).

Those pigments are fillers which are usually used can undergo surface pretreatment to increase their dispersibility and their compatibility with organic polymers.

This treatment can be inorganic and/or organic.

Inorganic treatment consists generally of coating the filler or pigment with one or more hydrated oxides, usually of silicon or aluminium.

U.S. Pat. No. 2,885,336 describes for example treatment with amorphous silica, whereas in U.S. Pat. No. 3,437,502 titanium dioxide is coated firstly with silica and then with alumina.

Organic treatment consists of coating the filler or pigment surface with an organic compound generally chosen from organic silicon compouns. Some examples of normally used organic silicon compounds are: vinyltrichlorosilane, vinyltriethoxysilane, vinyltrimethoxysilane, α-aminopropyltriethoxysilane, α-aminopropyltrimethoxysilane, N-β-aminoethyl-α-aminopropyl-triethoxysilane, N-β-aminoethyl-α-aminopropyl-trimethoxysilane, α-glycidoxypropyltrimethoxysilane and α-glycidoxypropyltriethoxysilane.

Inorganic fillers treated in this manner improve the processibility of the polymer, the characteristics of the final article, and the surface bloom due to the ejection of the filler by the polymer, and allow a greater quantity of filler to be added.

Although the introduction of thus treated fillers into the polymer also improves its resistance to ultraviolet degradation compared with a polymer to which untreated fillers have been added, it is always necessary to add a suitable quantity of a stabilizer compound to the polymer.

It has now been found possible to obtain inorganic fillers or pigments (hereinafter called stabilizing fillers or pigments) which are highly dispersible in and compatible with organic polymers while being able simultaneously to provide a reinforcing and stabilizing action on the polymer in which they are incorporated.

More specifically, according to the present invention, said stabilizing fillers or pigments are prepared by a process comprising the following stages:

(a) bringing the in organic filler or pigment into contact with a solution, in an inert organic solvent, of a sterically hindered amine comprising one or more alkoxysilane groups in its molecule;

(b) maintaining the obtained mixture at higher than ambient temperature (20°–25° C.) for a period of at least 0.5 hours;

(c) removing the solvent, treating at a temperature of 120°–200° C. and recovering the stabilizing filler or pigment obtained. The process of the invention can be applied to the fillers or pigments usually used in the art.

It is advantageously applied to titanium dioxide, whether this has previously undergone no treatment or has been treated with silica or alumina and/or organic compounds.

In addition to titanium dioxide, mica is also a particularly suitable filler for treatment by the process of the present invention.

The sterically hindered amines suitable for the purposes of the present invention are characterised by comprising in their molecule one or more hydrolysable alkoxysilane groups, and are chosen from the stabilizer compounds described in the U.S. Pat. No. 4,684,726 and patent application No. 103,961.

In particular, the sterically hindered amines of the present invention are preferably chosen from those of formula:

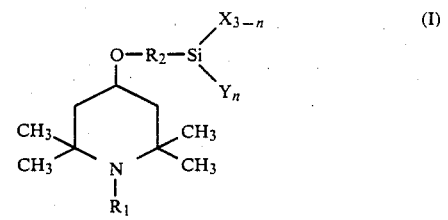

(I)

where:
$R_1$ = linear or branched $C_1$–$C_{10}$ alkyl radical, or a phenyl, cycloaliphatic, alkylphenyl or alkylcycloaliphatic radical, or hydrogen
$R_2$ = linear or branched $C_2$–$C_{10}$ alkylene radical
n = 1, 2 or 3
X = linear or branched $C_1$–$C_5$ alkyl radical
Y = $C_1$–$C_4$ alkoxy radical.

Some specific examples of sterically hindered amines suitable for the purposes of the present invention are:

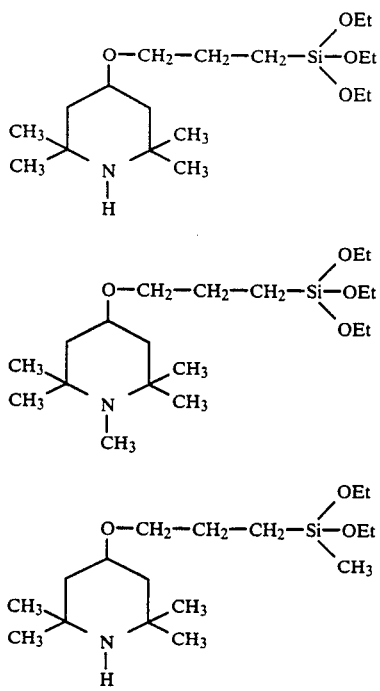

In stage (a) of said process, the filler or pigment in powder form and having a particle size between 1 μm and 300 μm is brought into contact with a solution of the sterically hindered amine in an inert organic solvent chosen from aliphatic, cycloaliphatic, or aromatic hydrocarbons or ethers.

According to a further embodiment of the present invention the filler or pigment is brought into contact with the amine in its hydrolysed form, said hydrolysis being effected before or during stage (a) by adding a suitable quantity of water.

The quantity of amine brought into contact with the filler in stage (a) varies from 0.1 to 10% by weight of the filler and preferably between 0.5 and 5%.

In stage (b), the mixture containing the filler or pigment and the sterically hindered amine is kept for a period of between 0.5 and 10 hours at a temperature higher than ambient (20°–25° C.) and up to 150° C., the preferred temperature being the boiling point of the solvent.

On termination of stage (b) the solvent is removed by evaporation under vacuum or by filtration, and the remaining solid is treated in an oven at a temperature of between 120° and 200° C. for a time of between 1 and 5 hours (stage c).

The stabilizing fillers or pigments thus obtained not only possess high dispersibility in and compatibility with organic polymers but also exhibit stabilizing properties in their regard, to protect them from the degradative action of ultraviolet radiation and heat.

Organic polymers particularly suitable for receiving said stabilizing fillers or pigments are olefin and diolefin homopolymers and copolymers such as polypropylene, polybutadiene and polyethylene of high and low density.

Other polymers suitable for the purpose are ethylene-vinylacetate copolymers, acrylonitrile terpolymers, polyacrylates, polyethers and polyurethanes, polycarbonates and polyamides.

The quantity of stabilizing filler or pigment added to the polymer varies from 0.5 to 40% by weight of the polymer and mixing is done by known methods.

The stabilizing action of the stabilizing fillers pigments of the present invention is better than that of the stabilizers of formula (I) when these are added to the polymer separately from the filler.

This is due to the fact that the sterically hindered amine is distributed uniformly on the filler surface and can therefore act at the filler-polymer interface, which is the point most strongly attacked by the ultraviolet radiation and heat.

If desired, the polymer compositions of the present invention can also contain other UV stabilizers and one or more additives such as antioxidants or peroxide decomposers in a quantity of between 0.01 and 5% of the polymer by weight, and preferably between 0.05 and 0.1%.

The following experimental examples are given for illustrative purposes only and do not limit the scope of the invention.

EXAMPLE 1

50 g of the commercial titanium dioxide KRONOS RLL (d=0.42 g/cc) of Kronos Titan are added to a solution of 2.5 g of compound (II) in 150 ml of n-heptane. The mixture obtained is heated under reflux for 5 hours.

At the end of this period the solvent is removed by evaporation under vacuum and the remaining solid is heated in an oven to 120° C. for 3 hours under vacuum (50 mmHg).

EXAMPLE 2

50 g of KRONOS RLL titanium dioxide are added to a solution of 1 g of compound (II) in 150 ml of n-heptane.

The mixture obtained is heated under reflux for 5 hours. At the end of this period the mixture is cooled and the solid phase is filtered off and oven-dried at a temperature of 120° C. for 3 hours. The solvent is evaporated from the liquid phase to obtain 0.2 g of unreacted compound (II).

The quantity of compound (II) bonded to the titanium dioxide is therefore 1.6% of the titanium used, by weight.

EXAMPLE 3

50 g of phlogopite mica of Messrs Kemira having an average particle size of 40 μm and a density of 0.4 g/cc are added to a solution of 2.5 g of product (II) in 150 ml of n-heptane.

The mixture obtained is then heated under reflux for 4 hours. At the end of this period the solvent is removed by evaporation under vacuum and the remaining solid is heated in an oven for 3 hours at 120° C. under a pressure of 50 mmHg.

EXAMPLE 4

50 g of the commercial titanium dioxide KRONOS CL 220 (density=4 g/cc) of Kronos Titan are added to a solution of 2.5 g of compound (II) in 150 ml of n-heptane.

The mixture obtained is then heated under reflux for 5 hours. After this, the solvent is removed by evaporation under vacuum and the solid obtained is heated in an oven to 120° C. under vacuum (50 mmHg) for 3 hours.

EXAMPLE 5

The fillers obtained as described in Examples 1 to 4 were added to a Riblene A42CL low-density polythene containing 0.5% of calcium stearate by weight.

For comparison purposes some polymer compositions were prepared containing only untreated fillers, and others were prepared containing both untreated fillers and the following silicon additive (HALS) having a mean numerical molecular weight of about 5000:

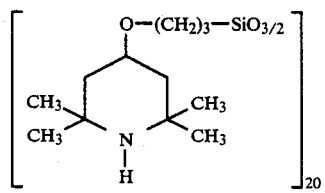

and prepared by polymerizing the monomer (II).

The comparison polymer compositions were prepared using the same quantity of filler and additive as the compositions containing the products of Examples 1 to 4.

The various compositions obtained are shown in Table 1.

After mixing in the dry state for 10 minutes, all the compositions were passed for 10 minutes through a roller mixer at 150° C. and then granulated and extruded to obtain a film of 150 μm thickness.

The extruder was used under the following conditions:

Temperature profile: 190°-200°-210°-220° C.
Speed: 60 rpm
Screw compression ratio: 1:4.

TABLE 1

| COMPONENT | COMPOSITION (parts by weight) | | | | | | | | | | | | |
|---|---|---|---|---|---|---|---|---|---|---|---|---|---|
| | A | B | C | D | E | F | G | H | L | M | N | O | P | Q |
| LDPE (A42CL) + 0.05% Ca stearate | 100 | 100 | 100 | 100 | 100 | 100 | 100 | 100 | 100 | 100 | 100 | 100 | 100 | 100 |
| KRONOS RLL | 0.5 | 0.5 | 5 | 5 | 5 | | | | | | | | | |
| KRONOS RLL treated as in Ex. 1 | | | | | | 0.5 | 5 | | | | | | | |
| KRONOS RLL treated as in Ex. 2 | | | | | | | | 5 | | | | | | |
| KRONOS CL 220 | | | | | | | | | 5 | 5 | 5 | | | |
| KRONOS CL 220 treated as in Ex. 4 | | | | | | | | | | | | 5 | | |
| KEMIRA Mica 40 | | | | | | | | | | | | | 5 | 5 |
| KEMIRA Mica 40 treated as in Ex. 3 | | | | | | | | | | | | | | | 5 |
| HALS | | 0.15 | | 0.15 | 0.25 | | | | 0.15 | 0.25 | | | 0.25 | |

EXAMPLE 6

The low-density polyethylene films prepared as described in Example 4 are subjected to UV irradiation using an ATLAS UVCON apparatus under the following conditions:

8 hours of light at a black panel temperature of 60° C.
4 hours of condensation at 40° C.

The ultimate elongation was measured at various exposure times by the ASTM D 638 method.

Table 2 shows the exposure times required to obtain a residual elongation of 50% of the original.

The same table also shows the exposure times required for the film to become brittle.

TABLE 2

| Composition | t 50% ultimate elongation (h) | t brittle (h) |
|---|---|---|
| A | 60 | 200 |
| B | 150 | 400 |
| C | 30 | 130 |
| D | 150 | 200 |
| E | 200 | 250 |
| F | 250 | 1150 |
| G | 580 | 1700 |
| H | 750 | 2100 |
| I | 300 | 550 |
| L | 450 | 1200 |
| M | 600 | 1600 |
| N | 600 | 2000 |
| O | 150 | 400 |
| P | 300 | 1100 |
| Q | 500 | 1800 |

We claim:

1. A process for preparing stabilizing fillers or pigments, characterized by comprising the following stages conducted in succession:
   (a) bringing an inorganic filler or pigment selected from the group consisting of titanium dioxide and mica into contact with a solution, in an inert organic solvent, of a sterically hindered amine comprising one or more alkoxysilane groups in its molecule;
   (b) maintaining the obtained mixture at higher than ambient temperature up to 150° C. for a period of from 0.5 hours to 10 hours;
   (c) removing the solvent, treating at a temperature of 120°-200° C. and recovering the stabilizing filler or pigment obtained.

2. A process as claimed in claim 1, characterized in that in stage (a) the filler or pigment is used in powder form of particle size between 1 and 300 μm.

3. A process as claimed in claim 1, characterized in that the sterically hindered amine is chosen from those of formula:

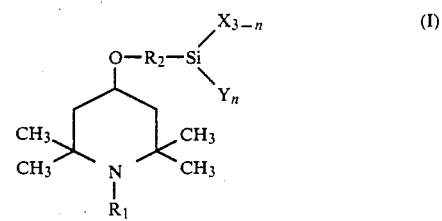

where:
$R_1$ is a linear or branched $C_1$-$C_{10}$ alkyl radical, or a phenyl, cycloaliphatic, alkylphenyl or alkylcycloaliphatic radical, or hydrogen
$R_2$ is a linear or branched $C_2$-$C_{10}$ alkylene radical
n is a whole number from 1 to 3
X is a linear or branched $C_1$-$C_5$ alkyl radical Y is a $C_1$–$C_4$ alkoxy radical.

4. A process as claimed in claim 3, characterized in that the sterically hindered amine is selected from the group consisting of compounds (II), (III) and (IV) having the formulas:

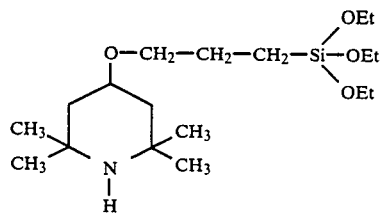 (II)

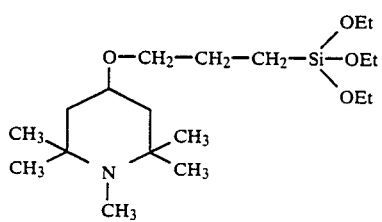 (III)

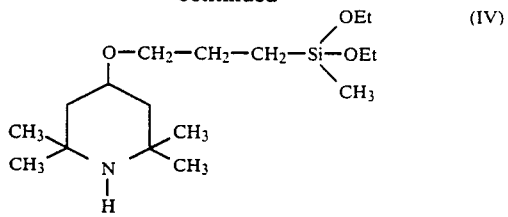 (IV)

5. A process as claimed in claim 1, characterized in that in stage (a) the quantity of sterically hindered amine varies from 0.5 to 10% of the filler or pigment, by weight.

6. A process as claimed in claim 5, characterized in that in stage (a) the quantity of sterically hindered amine varies from 0.5 to 5% of the filler or pigment, by weight.

7. A process as claimed in claim 1, characterized in that in stage (a) the inert organic solvent is selected from the group consisting of aliphatic, cycloaliphatic and aromatic hydrocarbons, and ethers.

8. A process as claimed in claim 1, characterized in that in stage (a) the filler or pigment is brought into contact with the sterically hindered amine in its hydrolysed form.

9. A process as claimed in claim 1, characterized in that the temperature in stage (b) is the solvent boiling point.

10. A process as claimed in claim 1, characterized in that in stage (c) the treatment at a temperature of between 120° and 200° C. lasts for between 1 and 5 hours.

* * * * *